(12) United States Patent
Gmirya

(10) Patent No.: US 10,358,211 B2
(45) Date of Patent: Jul. 23, 2019

(54) ROTOR APPARATUS

(71) Applicant: Sikorsky Aircraft Corporation, Stratford, CT (US)

(72) Inventor: Yuriy Gmirya, Woodbridge, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 245 days.

(21) Appl. No.: 15/108,867

(22) PCT Filed: Jan. 2, 2014

(86) PCT No.: PCT/US2014/010058
§ 371 (c)(1),
(2) Date: Jun. 29, 2016

(87) PCT Pub. No.: WO2015/102634
PCT Pub. Date: Jul. 9, 2015

(65) Prior Publication Data
US 2016/0318605 A1    Nov. 3, 2016

(51) Int. Cl.
*B64C 27/12* (2006.01)
*B64C 27/10* (2006.01)
*B64C 27/32* (2006.01)
*B64C 27/58* (2006.01)
(Continued)

(52) U.S. Cl.
CPC .............. *B64C 27/12* (2013.01); *B64C 27/10* (2013.01); *B64C 27/32* (2013.01); *B64C 27/58* (2013.01); *B64C 27/82* (2013.01); *B64D 35/06* (2013.01); *B64C 2027/8236* (2013.01); *B64C 2027/8272* (2013.01); *B64C 2027/8281* (2013.01)

(58) Field of Classification Search
CPC ......... B64C 27/12; B64C 27/82; B64C 27/58; B64C 27/10; B64D 35/06
See application file for complete search history.

(56) References Cited

U.S. PATENT DOCUMENTS 2,606,361 A * 8/1952 Keller .................. F16C 35/061
                                        29/283
2,990,718 A * 7/1961 Barnaby ................ G01C 19/38
                                        74/5 R (Continued)

FOREIGN PATENT DOCUMENTS

| DE | 10201208011 A1 | 11/2013 |
| EP | 2450584 A2 | 5/2012 |
| WO | 03091099 A2 | 11/2003 |

OTHER PUBLICATIONS

Extended European Search Report for EP Application No. 14877181.9 dated Sep. 15, 2017; 8 pages.

(Continued)

*Primary Examiner* — Brian M O'Hara
*Assistant Examiner* — Keith L Dixon
(74) *Attorney, Agent, or Firm* — Cantor Colburn LLP (57) ABSTRACT

A rotor apparatus is provided and includes a first rotor shaft disposed to rotatably support a first rotor, a second rotor shaft disposed to rotatably support a second rotor and first and second bearing elements disposed to support the first rotor shaft within the second rotor shaft and to pre-load the first rotor shaft in one of tension and compression and the second rotor shaft in the other one of tension and compression.

19 Claims, 5 Drawing Sheets

(51) Int. Cl.
  *B64C 27/82* (2006.01)
  *B64D 35/06* (2006.01)

(56) References Cited

U.S. PATENT DOCUMENTS

| | | | | |
|---|---|---|---|---|
| 4,269,043 | A * | 5/1981 | Kizu | F16D 3/76 |
| | | | | 464/83 |
| 4,302,154 | A | 11/1981 | Mack | |
| 4,832,636 | A | 5/1989 | McCormick | |
| 5,791,592 | A * | 8/1998 | Nolan | B64C 27/14 |
| | | | | 244/17.11 |
| 6,168,530 | B1 * | 1/2001 | Guimbal | B64C 27/12 |
| | | | | 384/498 |
| 6,439,849 | B1 * | 8/2002 | Sehgal | B64C 27/35 |
| | | | | 416/134 A |
| 6,659,877 | B2 * | 12/2003 | Wiesneth | F16C 3/035 |
| | | | | 384/49 |
| 7,913,580 | B2 * | 3/2011 | Burgman | F16H 57/0025 |
| | | | | 74/330 |
| 7,946,526 | B2 * | 5/2011 | Zimet | B64C 27/10 |
| | | | | 244/17.19 |
| 8,087,323 | B2 | 1/2012 | Hedman et al. | |
| 8,303,208 | B2 * | 11/2012 | Tully, Jr. | B64C 27/10 |
| | | | | 244/60 |
| 2002/0109044 | A1 * | 8/2002 | Rock | B64C 27/10 |
| | | | | 244/17.23 |
| 2008/0253891 | A1 | 10/2008 | Cabrera et al. | |
| 2010/0270421 | A1 | 10/2010 | Tully, Jr. et al. | |
| 2011/0194935 | A1 | 8/2011 | Garcia et al. | |
| 2017/0283049 | A1 * | 10/2017 | Weiner | B64C 27/33 |

OTHER PUBLICATIONS

International Search Report issue in PCT/US2014/010058, dated May 9, 2014; 8 pages.
Written Opinion issue in PCT/US2014/010058, dated May 9, 2014; 3 pages.

* cited by examiner

ROTOR APPARATUS

CROSS-REFERENCE TO RELATED APPLICATIONS

This application is a United States National Stage Application of International Patent Application No. PCT/US14/10058, which was filed on Jan. 2, 2014 designating the United States of America and which is incorporated herein by reference.

BACKGROUND OF THE INVENTION

The subject matter disclosed herein relates to a rotor apparatus and, more particularly, to a rotor apparatus in which bearing elements pre-load at least one of first and second rotor shafts against the other.

Coaxial helicopters are helicopters that include coaxial main rotors (or co-rotors). Coaxial main rotors are generally provided as a pair of helicopter rotors mounted one above the other on concentric rotor shafts, with the same axis of rotation, but that turn in opposite directions (contra-rotation).

In order to reach high forward flight speed, coaxial helicopters utilize coaxial main rotors that are relatively rigid. This rigidity tends to induce excessive flight loads, such as especially hub moments, to the helicopter transmissions. These loads are normally transferred by the rotor shafts through their respective bearings to the gearbox housings and the airframe. The rotor shafts are typically coupled with the gear train inside of the gearbox and any deflection of the rotor shafts may degrade gear performance. Therefore, reduction in rotor shaft deflection is desired but often limited due to the magnitude of the flight loads.

Moreover, since each rotor shaft may be supported independently by a set of bearings, each rotor shaft reacts to the flight loads as a separate system and has to be sized accordingly to do so. In addition, since flight loads vary significantly based on flight conditions, the various components associated with the rotor shaft are sized for the worst expected loads. The rotor shafts may therefore be overdesigned and thus significant contributors to the weight of the dynamic systems. Indeed, in some cases, the rotor shaft weights may reach more than 50% of the entire gearbox and in coaxial transmission configurations, these issues are magnified by the presence of the two main rotor shafts.

BRIEF DESCRIPTION OF THE INVENTION

According to one aspect of the invention, a rotor apparatus is provided and includes a first rotor shaft disposed to rotatably support a first rotor, a second rotor shaft disposed to rotatably support a second rotor and first and second bearing elements disposed to support the first rotor shaft within the second rotor shaft and to pre-load the first rotor shaft in one of tension and compression and the second rotor shaft in the other one of tension and compression.

In accordance with embodiments, the rotor apparatus further includes a first gear train operably coupled to the first rotor shaft to drive rotation of the first rotor shaft a second gear train operably coupled to the second rotor shaft to drive rotation of the second rotor shaft, wherein the first bearing elements are disposed along the first and second rotor shafts proximate to the second gear train.

In accordance with embodiments, the rotor apparatus further includes a transmission housing of a rotorcraft and third bearing elements disposed to support the first and second rotor shafts against the transmission housing.

In accordance with embodiments, the first and second bearing elements pre-load the first rotor shaft in tension against the second rotor shaft.

In accordance with embodiments, the first and second bearing elements pre-load the first and second rotor shafts against one another.

In accordance with embodiments, at least one of the first and second rotor shafts includes lightweight and high strength metallic materials, alloys or composites.

In accordance with embodiments, the rotor apparatus further includes an annulus defined between the first and second rotor shafts, and a fluid disposed in the annulus to thermally match the first and second rotor shafts.

In accordance with embodiments, the first rotor shaft has a first longitudinal axis, the second rotor shaft has a second longitudinal axis and the first and second rotor shafts are preloaded in a direction defined substantially in parallel with the first and second longitudinal axes of the first and second rotor shafts.

In accordance with embodiments, the rotor apparatus further includes a first gear train operably coupled to the first rotor shaft to drive rotation of the first rotor shaft and a second gear train operably coupled to the second rotor shaft to drive rotation of the second rotor shaft, wherein the first bearing elements are disposed along the first and second rotor shafts proximate to the second gear train.

In accordance with embodiments, the rotor apparatus further includes a transmission housing of a rotorcraft and third bearing elements disposed to support the first and second rotor shafts against the transmission housing.

In accordance with embodiments, the first and second bearing elements pre-load the first rotor shaft in tension against the second rotor shaft.

In accordance with embodiments, the first and second bearing elements pre-load the first and second rotor shafts against one another.

In accordance with embodiments, at least one of the first and second rotor shafts comprises lightweight and high strength metallic materials, alloys or composites.

In accordance with embodiments, the rotor apparatus further includes an annulus defined between the first and second rotor shafts, and a fluid disposed in the annulus to thermally match the first and second rotor shafts.

According to another aspect of the invention, an aircraft is provided and includes an airframe, an engine, which produces a rotary output, and a transmission, which transmits the rotary output from the engine to the above-referenced rotor apparatus.

According to yet another aspect of the invention, a counter rotating shaft assembly is provided and includes a first hollow shaft having a first longitudinal axis and which rotates in a first direction, a second hollow shaft having a second longitudinal axis and which rotates in a second direction and first and second bearing elements disposed to rotatably support the first hollow shaft substantially concentrically within the second hollow shaft and to axially pre-load the first hollow shaft in one of tension and compression, and to axially preload the second hollow shaft in the other one of tension and compression.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

The configuration described below is capable of limiting the deflection of a shafting system of a coaxial helicopter under heavy flight loads while reducing sizes and weights of the rotor shafts. In the configuration, two rotor shafts are preloaded against each other by stretching one shaft and compressing another one. The preload force combines the two shafts in one system and forces them to react to flight loads together as a single unit and/or has the outer shaft taking more of the load. The dual wall shaft structure creates efficient support and limits deflection. In addition, since the shaft system has an increased stiffness, light-weight materials, such as titanium, may be used for the rotor shafts. Also, in order to minimize thermal mismatch between the shafts during operation and to reduce extra forces to the supporting bearings, a volume defined by the two shafts and upper and lower inner bearings may be filled with transmission oil.

Figure 1:
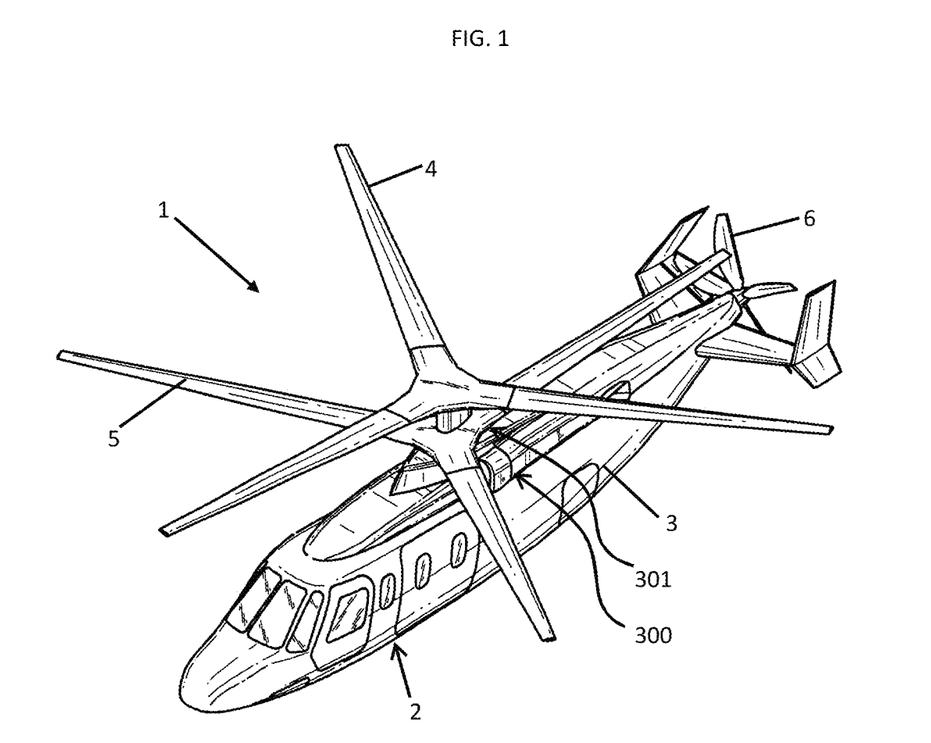
FIG. 1 is a perspective view of a coaxial helicopter in accordance with embodiments.
Figure 2:
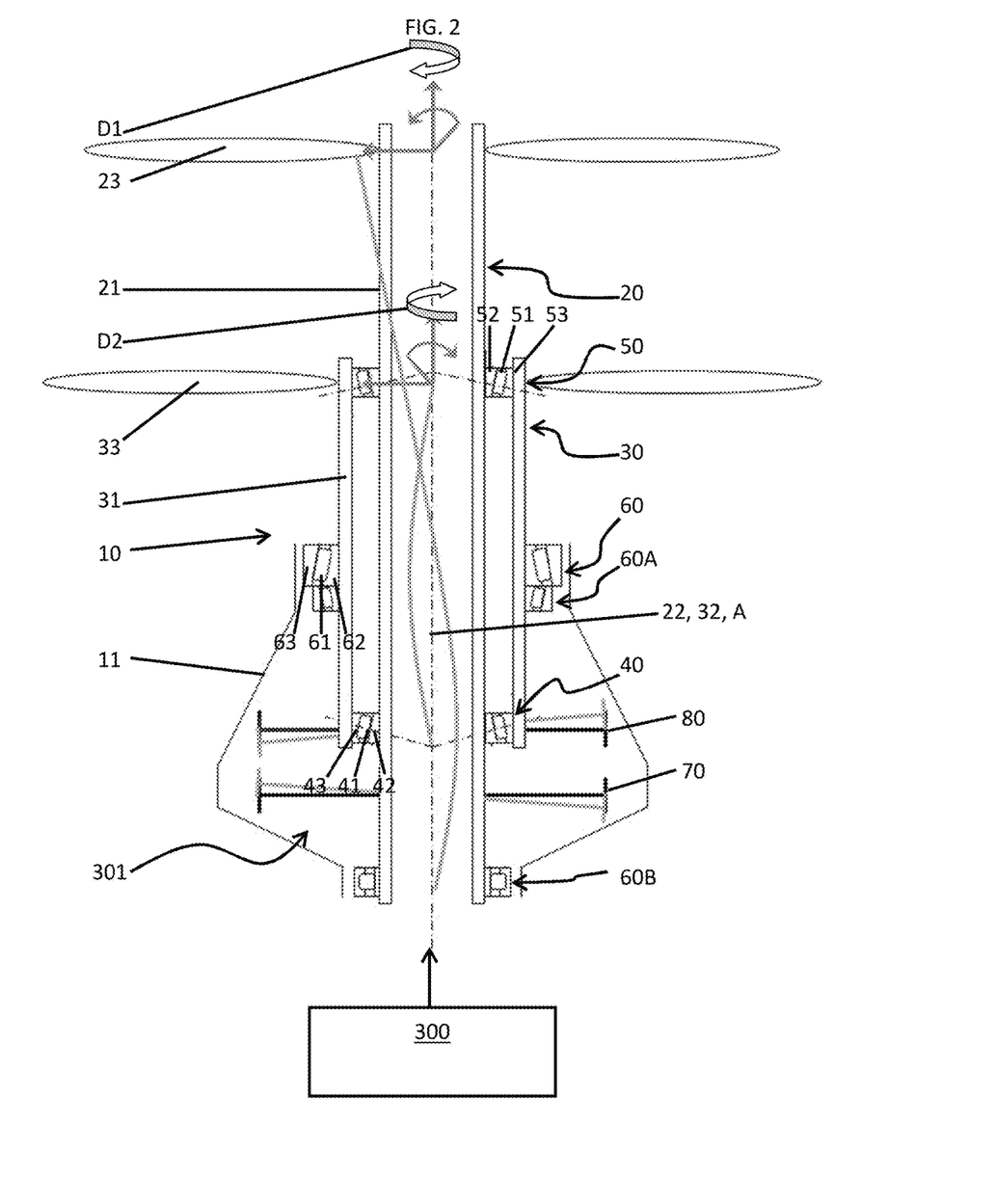
FIG. 2 is a schematic side view of a rotor apparatus subject to shaft deformation.
Figure 3:
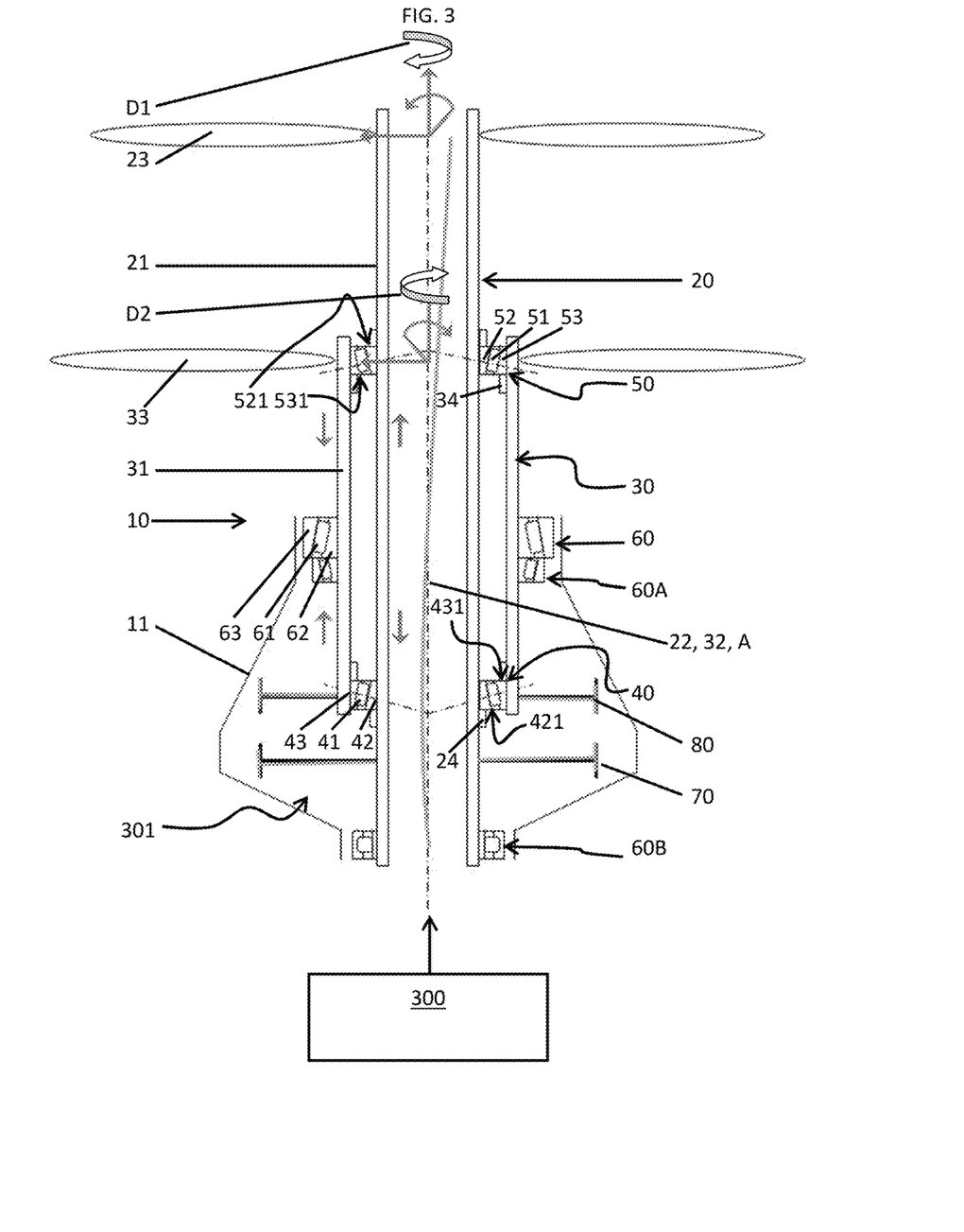
FIG. 3 is a schematic side view of a rotor apparatus configured for shaft deformation correction in accordance with embodiments.

With reference to FIGS. 1-3, a rotor apparatus 10 is provided. The rotor apparatus 10 may be disposed within a transmission housing 11 of a helicopter 1. The helicopter 1 may be provided, for example, as a coaxial helicopter 2, which includes an airframe 3 encompassing an engine 300, a transmission 301 and the transmission housing 11, upper and lower coaxial, counter-rotating main rotors 4 and 5 and a propeller rotor 6. The upper and lower coaxial, counter rotating main rotors 4 and 5 are rotatably supported at a top portion of the airframe 3 and are rotatable in opposite directions relative to the airframe 3. The propeller rotor 6 is rotatably supported at a rear of the airframe 3. The engine 300 produces a rotary output and thereby drives the rotation of the upper and lower coaxial, counter-rotating main rotors 4 and 5 and the propeller rotor 6 via the transmission 301, which transmits the rotary output of the engine 300 to the rotor apparatus 10.

The rotor apparatus 10 includes a first rotor (or hollow) shaft 20, a second rotor (or hollow) shaft 30, lower or first bearing elements 40 and upper or second bearing elements 50. The first rotor shaft 20 has a tubular shaped body 21 with a first longitudinal axis 22 and is disposed to rotatably support a first rotor 23 to rotate in a first direction D1 relative to the transmission housing 11. The second rotor shaft 30 has a tubular shaped body 31 with a second longitudinal axis 32 and is disposed to rotatably support a second rotor 33 to rotate in a second direction D2 relative to the transmission housing 11. The first and second directions D1 and D2 may be defined opposite one another such that the rotor apparatus 10 may include or be provided as a counter rotating shaft assembly.

The first rotor shaft 20 is disposed substantially concentrically within the second rotor shaft 30 and is longer than the second rotor shaft 30 along the first and second longitudinal axes 22 and 32. The first rotor shaft 20 is rotatably supported in this position by the first bearing elements 40 and the second bearing elements 50. The second rotor shaft 30 is rotatably supported within and against the transmission housing 11 by third bearing elements 60, 60A, and 60B. The rotor apparatus 10 further includes a first gear train 70 and a second gear train 80. The first gear train 70 is operably coupled to the first rotor shaft 20 to drive the rotation of the first rotor shaft 20 and the first rotor 23 and the second gear train 80 is operably coupled to the second rotor shaft 30 to drive the rotation of the second rotor shaft 30 and the second rotor 33. The first bearing elements 40 are disposed along the first and second rotor shafts 20 and 30 at an axial location defined proximate to the second gear train 80. The second bearing elements 50 are disposed along the first and second rotor shafts 20 and 30 at an axial location defined remotely from the second gear train 80.

The first, second and third bearing elements 40, 50, 60, 60A and 60B may be provided in various forms and configurations. For instance, while shown with the particular bearing locations based on a particular gearbox layout and driven by specific, structural considerations in a particular aspect of the invention, the locations and numbers of bearings is not so limited in other aspects. In an exemplary embodiment, the first, second and third bearing elements 40, 50, 60, 60A and 60B include rollers 41, 51 and 61 respectively suspended between inner races 42, 52 and 62 and outer races 43, 53 and 63.

In any case, the first and second bearing elements 40 and 50 are disposed to support the first rotor shaft 20 substantially concentrically within the second rotor shaft 30 and to axially pre-load at least one or both of the first and second rotor shafts 20 and 30 against the other in a direction A, which is defined substantially in parallel with the first and second longitudinal axes 22 and 32 of the first and second rotor shafts 20 and 30. In coaxial helicopter rotors, as noted above, the first and second rotor shafts 20 and 30 will tend to experience deformation under flight loading. This deformation extends along the first and second longitudinal axes 22 and 32 as illustrated in FIG. 2, wherein the deformation is exaggerated for clarity. In accordance with embodiments described herein, however, the deformation of the first and second rotor shafts 20 and 30 is limited by the axial pre-loading provided by the first and second bearing elements 40 and 50 as illustrated in FIG. 3, wherein the deformation is exaggerated for clarity.

The first and second bearing elements 40 and 50 may be configured to axially pre-load at least the first rotor shaft 20 in tension against the second rotor shaft 30. More particularly, the first and second bearing elements 40 and 50 may be configured to axially pre-load the first and second rotor shafts 20 and 30 in tension and compression, respectively, against one another. The axial pre-loading is provided by a tensile stretching of the first rotor shaft 20 and a corresponding compression of the second rotor shaft 40 and this tensile stretching and compression is provided by the first rotor shaft 20 including first bearing support elements 24 and the second rotor shaft 30 including second bearing support elements 34. The first bearing support elements 24 impinge upon axially exterior sides 421, 521 of the inner races 42, 52 of the first and second bearing elements 40 and 50 and the second bearing support elements 34 impinge upon axially interior sides 431, 531 of the outer races 43, 53 of the first and second bearing elements 40 and 50.

Figure 4:
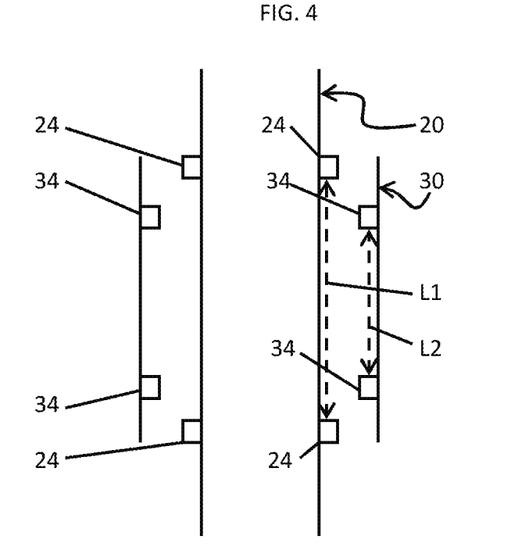
FIG. 4 is an enlarged view of bearing elements of the rotor apparatus of FIG. 3 prior to connection.
Figure 5:
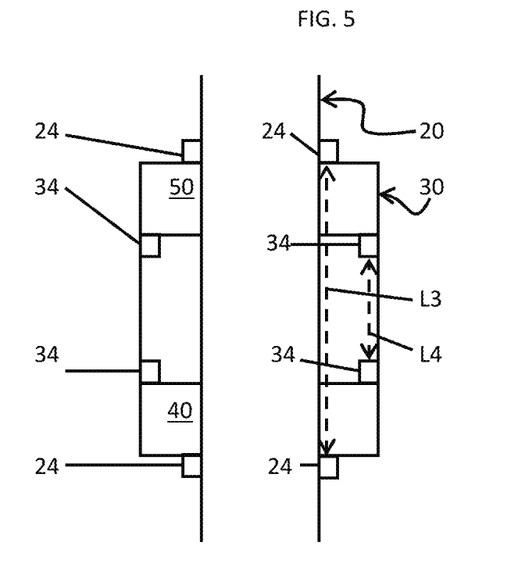
FIG. 5 is an enlarged view of the bearing elements of the rotor apparatus of FIG. 3 following connection.

With reference to FIGS. 4 and 5, the un-loaded axial length of the first rotor shaft 20 between the first bearing support elements 24 may have an initial length value of L1 while the un-loaded axial length of the second rotor shaft 30 between the second bearing support elements 34 may have an initial length value of L2 (see FIG. 4). However, once connections are made between the first and second rotor shafts 20 and 30 and the first and second bearing elements 40 and 50, the axial length of the first rotor shaft 20 between the first bearing support elements 24 may be extended and the axial length of the second rotor shaft 30 between the second bearing support elements 34 may be reduced. As such, the now pre-loaded axial length of the first rotor shaft 20 between the first bearing support elements 24 may have a length value of L3 while the now pre-loaded axial length of the second rotor shaft 30 between the second bearing support elements 34 may have a length value of L4 (see FIG. 5).

As shown, the placement of bearing elements 40 and 50 makes the length value of L3 be greater than that of L1 creating a tensile preload, and the length value of L4 be less than that of L2 creating a compressive preload. However, it is understood that the tensile and compressive preloads could be reversed in other aspects such as where the rotational directions of the first and second rotor shafts 20 and 30 are reversed. Further, it is understood that other mechanisms could be used to impart opposing preloads into the first and second rotor shafts 20 and 30 in addition to or instead of first and second bearing support elements 24 and 34.

The extension of the axial length of the first rotor shaft 20 from the initial length value of L1 to L3 serves to pre-load the first shaft 20 in tension and the compression of the axial length of the second rotor shaft 30 from the initial length value of L2 to L4 serves to pre-load the second rotor shaft 20 in compression. The tension of the first rotor shaft 20 and the compression of the second rotor shaft 30 reduce the tendencies of the first and second rotor shafts 20 and 30 to deform under flight loading.

In accordance with embodiments, the preloading of the first and second rotor shafts 20 and 30 allows the rotor apparatus 10 to act as a unit under flight loading. The preloading changes how the first and second rotor shafts 20 and 30 react to the flight loads, permits sizes and weights of the first and second rotor shafts 20 and 30 to be correspondingly reduced and additionally permits alternative materials, such as lightweight and high strength metallic materials, alloys or composites (e.g., titanium), to be used in at least one of the first and second rotor shafts 20 and 30.

Figure 6:
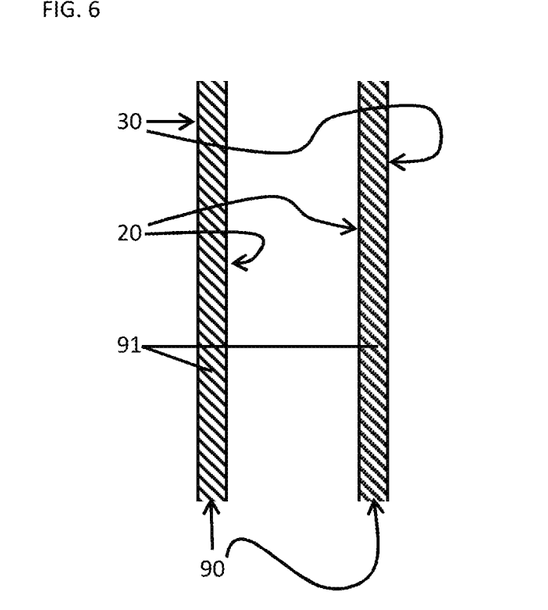
FIG. 6 is a schematic view of a fluid filled annulus defined by rotor shafts of the rotor apparatus of FIG. 3.

While not required in all aspects, in accordance with further embodiments and, with reference to FIG. 6, an annulus 90 defined between the first and second rotor shafts 20 and 30 and between the first and second bearing elements 40 and 50 may be filled with fluid 91, such as transmission oil to thermally match the various components described herein with one another. However, it is understood that other fluids, lubricants or greases could be used which have like thermal matching capabilities.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. By way of example, aspects of the invention could be used in other counter hollow rotary shafts beyond those used in rotary aircraft, such as those used in wind turbines, counter rotating marine engines industrial drive systems or other like systems where combined counter rotating shafts react to opposing loads. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A rotor apparatus, comprising:
a first rotor shaft disposed to rotatably support a first rotor;
a second rotor shaft disposed to rotatably support a second rotor; and
first and second bearing elements disposed to support the first rotor shaft within the second rotor shaft and to pre-load the first rotor shaft in one of tension and compression and the second rotor shaft in the other one of tension and compression;
wherein, when the first rotor shaft is in tension and the second rotor shaft is in compression, then a pre-loaded axial length of the first rotor shaft is longer than an unloaded axial length of the first rotor shaft, and a pre-loaded axial length of the second rotor shaft is shorter than an unloaded axial length of the second rotor shaft, and, when the first rotor shaft is in compression and the second rotor shaft is in tension, then a pre-loaded axial length of the first rotor shaft is shorter than an unloaded axial length of the first rotor shaft, and a pre-loaded axial length of the second rotor shaft is longer than an unloaded axial length of the second rotor shaft.

2. The rotor apparatus according to claim 1, further comprising:
a first gear train operably coupled to the first rotor shaft to drive rotation of the first rotor shaft; and
a second gear train operably coupled to the second rotor shaft to drive rotation of the second rotor shaft,
wherein the first bearing elements are disposed along the first and second rotor shafts proximate to the second gear train.

3. A rotor apparatus, comprising:
a first rotor shaft disposed to rotatably support a first rotor;
a second rotor shaft disposed to rotatably support a second rotor;
first and second bearing elements disposed to support the first rotor shaft within the second rotor shaft and to pre-load the first rotor shaft in one of tension and compression and the second rotor shaft in the other one of tension and compression;
a transmission housing of a rotorcraft; and
third bearing elements disposed between the first rotor shaft and the transmission housing and between the second rotor shaft and the transmission housing to support the first and second rotor shafts against the transmission housing.

4. The rotor apparatus according to claim 1, wherein the first and second bearing elements pre-load the first rotor shaft in tension against the second rotor shaft.

5. The rotor apparatus according to claim 1, wherein the first and second bearing elements pre-load the first and second rotor shafts against one another.

6. The rotor apparatus according to claim 1, wherein at least one of the first and second rotor shafts comprises lightweight and high strength metallic materials, alloys or composites.

7. The rotor apparatus according to claim 1, further comprising an annulus defined between the first and second rotor shafts and between the first and second bearing elements, and a fluid disposed in the annulus to thermally match the first and second rotor shafts.

8. The rotor apparatus according to claim 1 wherein:
the first rotor shaft has a first longitudinal axis;
the second rotor shaft has a second longitudinal axis, and
the first and second rotor shafts are preloaded in a direction defined substantially in parallel with the first and second longitudinal axes of the first and second rotor shafts.

9. The rotor apparatus according to claim 8, further comprising:
a first gear train operably coupled to the first rotor shaft to drive rotation of the first rotor shaft; and
a second gear train operably coupled to the second rotor shaft to drive rotation of the second rotor shaft,
wherein the first bearing elements are disposed along the first and second rotor shafts proximate to the second gear train and the second bearing elements are axially spaced from the first bearing elements and the second gear train.

10. The rotor apparatus according to claim 8, further comprising:
a transmission housing of a rotorcraft; and
third bearing elements disposed between the first rotor shaft and the transmission housing and between the second rotor shaft and the transmission housing to support the first and second rotor shafts against the transmission housing.

11. The rotor apparatus according to claim 8, wherein the first and second bearing elements pre-load the first rotor shaft in tension against the second rotor shaft.

12. The rotor apparatus according to claim 8, wherein the first and second bearing elements pre-load the first and second rotor shafts against one another.

13. The rotor apparatus according to claim 8, wherein at least one of the first and second rotor shafts comprises lightweight and high strength metallic materials, alloys or composites.

14. The rotor apparatus according to claim 8, further comprising an annulus defined between the first and second rotor shafts, and a fluid disposed in the annulus to thermally match the first and second rotor shafts.

15. An aircraft, comprising:
an airframe;
an engine, which produces a rotary output; and
a transmission, which transmits the rotary output from the engine to the rotor apparatus of claim 1.

16. The rotor apparatus of claim 1, wherein the first rotor shaft rotates in a first direction;
and the second rotor shaft rotates in a second direction; and
the first and second bearing elements are disposed to rotatably support the first rotor shaft substantially concentrically within the second rotor shaft.

17. The rotor apparatus according to claim 1, wherein the first and second bearing elements are disposed between the first and second rotor shafts and the first and second bearing elements are axially spaced with respect to each other.

18. A rotor apparatus, comprising:
a first rotor shaft disposed to rotatably support a first rotor;
a second rotor shaft disposed to rotatably support a second rotor; and
first and second bearing elements disposed to support the first rotor shaft within the second rotor shaft and to pre-load the first rotor shaft in one of tension and compression and the second rotor shaft in the other one of tension and compression;
wherein the first rotor shaft includes first bearing support elements disposed to impinge upon axially exterior sides of inner races of the first and second bearing elements, and the second rotor shaft includes second bearing support elements disposed to impinge upon axially interior sides of outer races of the first and second bearing elements.

19. The rotor apparatus according to claim 3, wherein the third bearing elements include rollers disposed between the second rotor shaft and the transmission housing.

* * * * *